Sept. 13, 1966      H. G. HANCOCK      3,271,891
FISHING DEVICE

Filed July 21, 1964      3 Sheets-Sheet 1

INVENTOR.
HENRY G. HANCOCK
BY
Newton, Hopkins & Jones
ATTORNEYS

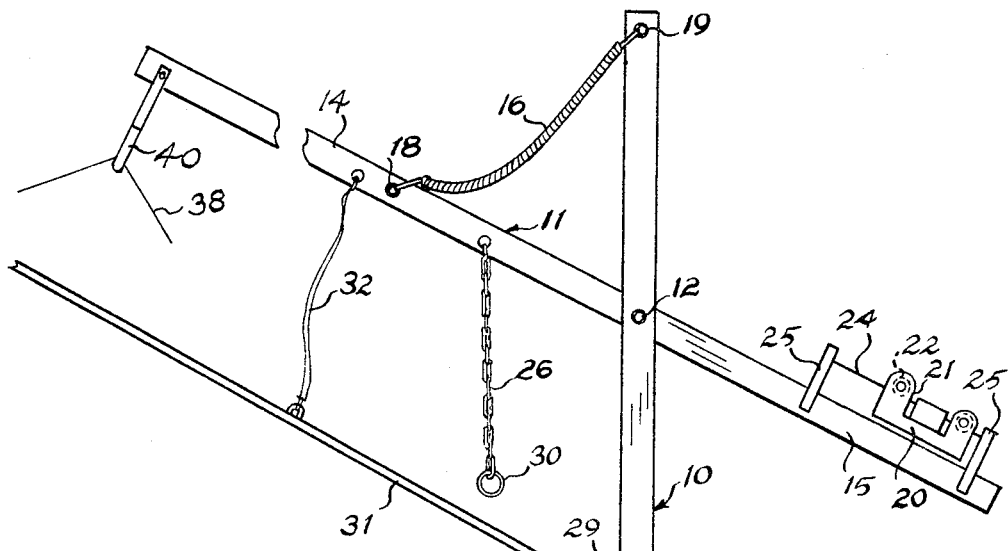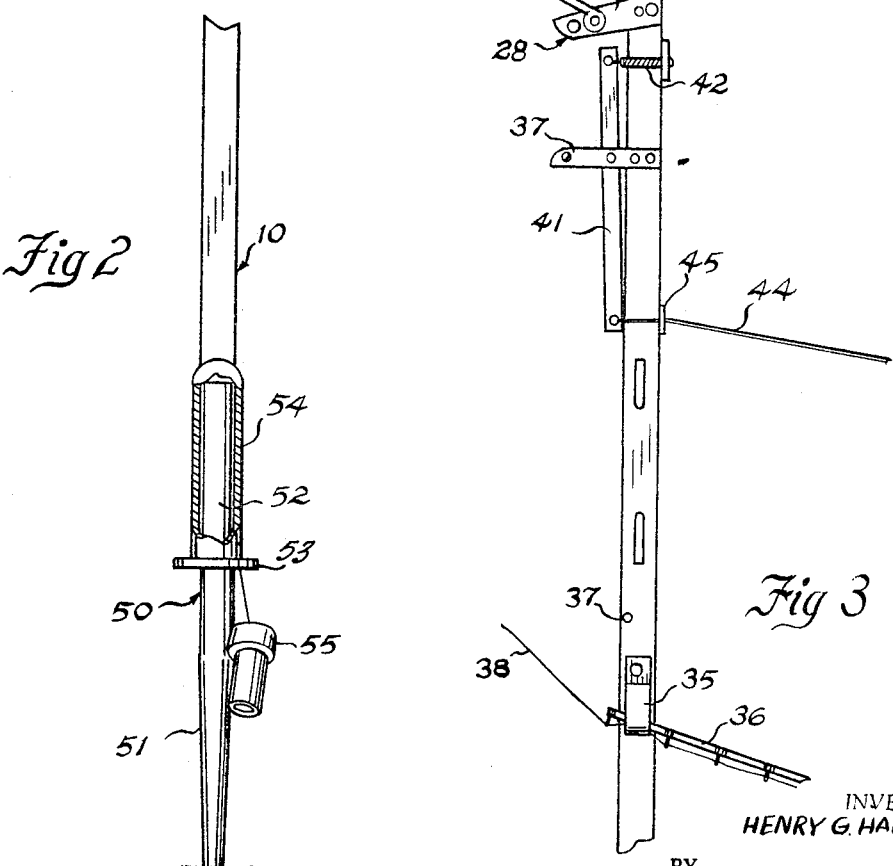

United States Patent Office 3,271,891
Patented Sept. 13, 1966

3,271,891
FISHING DEVICE
Henry G. Hancock, 150 Forest Ave., Macon, Ga.
Filed July 21, 1964, Ser. No. 384,162
6 Claims. (Cl. 43—15)

This invention relates to fishing apparatus, and is more particularly concerned with automatic apparatus for setting the hook in a fish when a fish bites at the bait.

When a person is fishing, he is frequently inattentive to the line, being concerned with manipulating the pole and himself for maximum comfort. Even if the fisherman is watching the cork, it may bob as the fish grabs the bait, but the fish may run away with the bait before the fisherman has a chance to manipulate the pole to pull the line taut and set the hook in the fish. Also, many fishermen like to rest on the bank of the lake without paying attention to the pole, and still be able to catch the fish when a fish takes the bait.

The device of the present invention provides an automatic means by which, upon tightening of the line, the line will be pulled sharply and severely to set the hook; then, the line can be drawn in to reel in the fish at will. Very sensitive trigger means are used on the device to assure that the device will be triggered as soon as a fish grabs the bait and pulls the line taut. The arrangement is such that a very large force will be exerted initially to pull the line; then, when the apparatus has moved to the extent that the first means is no longer sufficiently operable, a second means will take over to continue to move the apparatus to its stop and make the line relatively short so the fish will not have much line, and there is sufficient holding force on the apparatus to play the fish.

In the event that the fisherman wishes to stop away from the device, but to operate the device manually, manual trigger releasing means are provided that can be operated at a distance from the device.

In general terms, the device includes a vertical member having a cross-arm pivotally attached thereto. The end of the fishing pole is held by the vertical member, and the line extends through a hook carried by one end of the pivoted cross-arm. Spring means tend to rotate the cross-arm in one direction; and, the trigger means prevents rotation of the cross-arm until the trigger is released, the trigger means being operable by the fishing line. After the cross-arm has rotated to a certain extent, a shiftable weight moves outwardly of the arm to provide a larger moment of inertia that will carry the cross-arm to its limit and will make it more difficult for a fish to pull the cross-arm back and get more line. The manual release means includes a rotatable finger that will act the same as the fishing line to release the trigger.

It will therefore be seen that the apparatus of the present invention provides a very simple and efficient means for putting a sudden tension on a fishing line to set a hook in a fish. The device is so arranged that a large force will be exerted initially on the line, and sufficient force will be exerted to continue to pull the line to its maximum extent. The device is rugged, durable, and well designed to be manufactured economically.

Other features and advantages of the present invention will become apparent from consideration of the following specification when taken in conjunction with the accompanying drawings, in which:

FIG. 2 is a side elevational view of the bottom end of the vertical member showing the stake for supporting the vertical member;

FIG. 3 is a view similar to FIG. 1, showing the cross-arm in released position.

Referring now more particularly to the drawings and to that embodiment of the invention here chosen by way of illustration, the device includes a vertical support 10 having a cross-arm 11 pivotally connected thereto at 12. It will be noticed from FIGS. 1 and 3 of the drawings that the forward portion 14 of the cross-arm 11 is longer than the rearward portion 15, the forward portion 14 of the cross-arm 11 being the operating end of the cross-arm, and the rearward portion 15 of the cross-arm 11 being the counter balancing portion.

Figure 1:
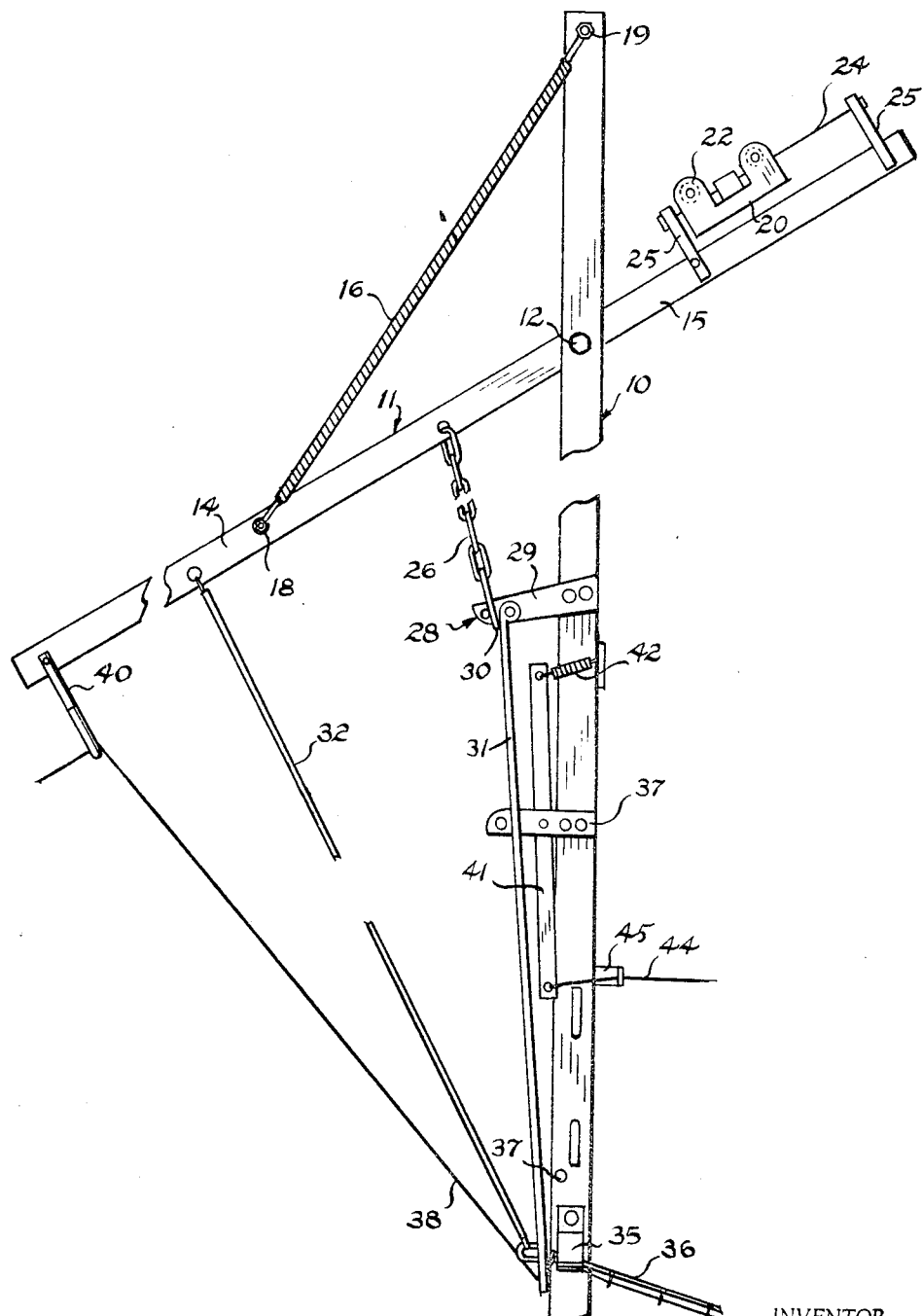
FIG. 1 is a side elevational view of one preferred embodiment of the present invention, the cross-arm being in latched position.

There is a spring 16 connected to the forward portion 14 of the cross-arm 11 at 18, the opposite end of the spring 16 being connected to the uppermost end of the vertical support member 10 as indicated at 19. On the rearward portion 15 of the cross-arm 11, there is a slidable weight 20 on a carriage 21. The carriage 21 has a pair of rollers 22 by which the carriage is mounted on a track 24, the track 24 being mounted between a pair of upstanding brackets 25. It will therefore be seen that the carriage 21 with its weight 20 is free to move back and forth on the track 24 between the brackets 25, depending on the angular disposition of the cross-arm 11. When the weight 20 is at its forward extremity as shown in FIG. 1, the distance from the pivot 12 to the center of gravity of the weight 20 is a minimum, causing a relatively low moment of inertia about the pivot 12; on the other hand, when the carriage 21 is at its rearmost extremity, as shown in FIG. 3 of the drawings, the distance between the pivot point 12 and the center of gravity of weight 20 is relatively large, causing a fairly high moment of inertia about the pivot point 12.

It will now be seen that, when the cross-arm 11 is rotated in a counterclockwise direction as viewed in the drawings, the spring 16 will be stretched, and the carriage 21 and its weight 20 will move forwardly toward the pivot point 12 so that the spring exerts a rather large clockwise force on the cross-arm 11, and the moment of inertia about the pivot point 12 is at a minimum. When the cross-arm 11 is allowed to rotate in a clockwise direction, the moment of the inertia is small enough that the spring 16 can move the cross-arm very rapidly; but, when the cross-arm 11 has rotated sufficiently for the weight 20 to move out on the cross-arm, the moment of inertia is increased to make it difficult for a fish to rotate the cross-arm enough to get more line. The weight 20 cannot move a very large distance; but, the moment of inertia is proportional to the square of the distance between the pivot point and the center of gravity of the weight so a considerable change in the moment of inertia can be effected by a small change in the location of the weight 20.

To hold the cross-arm 11 in its counterclockwise rotated position, there is a chain 26 depending from the cross-arm 11 and removably attached to the trigger mechanism generally designated at 28. In more detail, the trigger mechanism 28 includes a forwardly extending latch 29 that is fixed to the vertical support 10, substantially perpendicularly thereto the outermost end of which receives a ring 30 that is attached to the chain 26. There is a releasing strap 31 pivotally attached to the latch 29 just rearward of the outer end of the latch, and extending downwardly. Thus, it will be seen that if the releasing strap 31 is pivoted forwardly, the ring 30 will be urged off the end of the latch 29.

There is an elastic member 32 that extends between the forward portion 14 of the cross-arm 11 and the lowermost end of the releasing strap 31 to assist in the urging of the ring 30 off the latch 29. This elastic member 32 makes the trigger mechanism 28 more sensitive than would otherwise be the case, and can be shortened or lengthened to vary the sensitivity of the trigger. It is to be noted that, the spring 16 is strong relative to the elastic member 32, and therefore the ring 30 will be urged against the latch member 29 with sufficient force that the ring 30 will normally prevent rotation of the releasing strap.

The trigger mechanism 28 must, of course, be responsive to tension in the fishing line. To accomplish this, there is a hook 35 fixed to the side of the vertical supporting member 10 adjacent the lowermost end of the releasing strap 31, the hook 35 being adapted to receive the tip end of the fishing pole 36 having a line 38 thereon; and, the line 38 passes beneath the releasing strap 31 through a V-shaped groove 39 therein, toward the forward portion of the cross-arm 11 and through a hook 40 that is attached to the outermost end of the forward portion 14 of the cross-arm 11. A pin 37 projects from the support member 10 just above the hook 35 to limit any upward movement of the pole 36.

It will thus be seen that, when tension is put on the line 38, the releasing strap 31 will be urged forwardly and assisted by the resilient member 32. As the releasing strap 31 pivots forwardly, the ring 30 will be pushed off the latch 29 to release the cross-arm 11 and allow clockwise rotation about the pivot 12. Such clockwise rotation will pull the hook 40 up sharply, and pull the line 38 to set the hook (not shown) in the fish.

Figure 4:
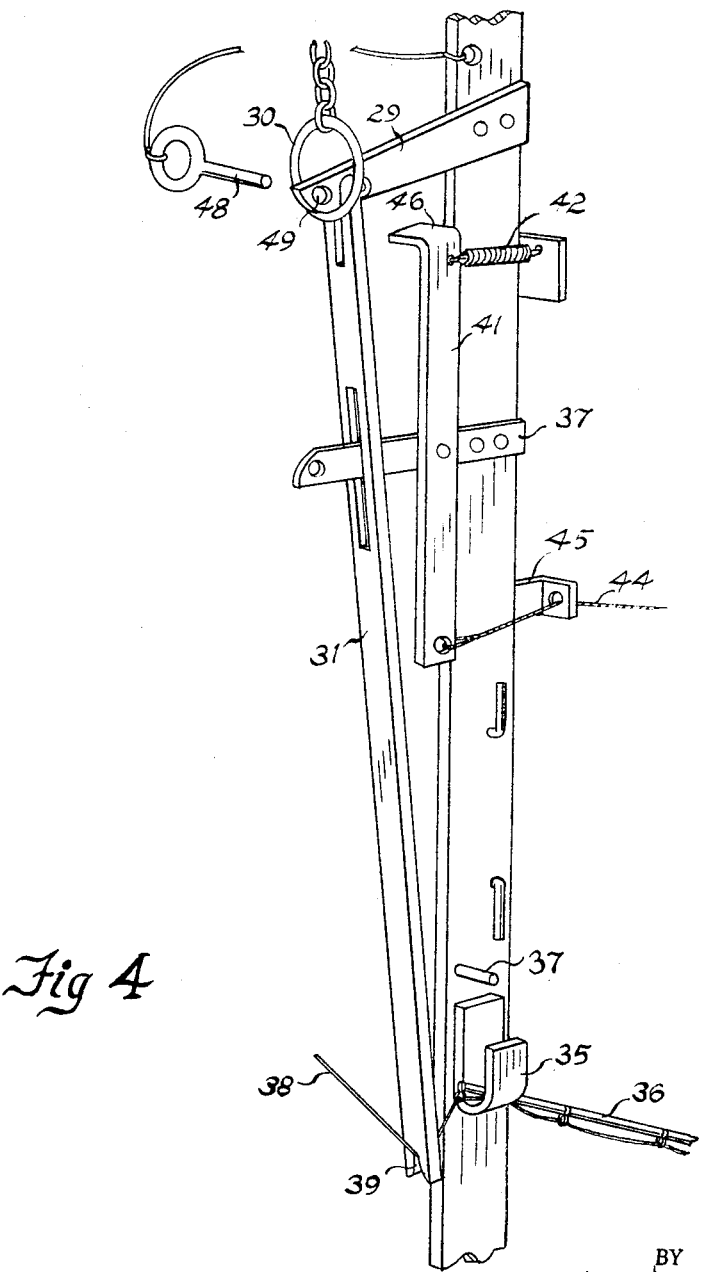
FIG. 4 is an enlarged perspective view of the trigger mechanism of the present invention.

It may, at times, be desirable to release the device manually rather than to wait for a fish to pull on the line 38 sufficiently strongly to release the trigger mechanism, for example, if a very small fish has taken the bait. For manual release, there is a pivoted lever 41 attached to the projection 37 and disposed adjacent the vertical support 10. At the upper end of the lever 41 there is a spring 42 to urge the lever 41 in a clockwise direction; and, at the lower end of the lever 41, there is a string or wire 44 that passes through a guide 45, then goes rearwardly to any convenient location from which a person may wish to operate the device manually. As best shown in FIG. 4 of the drawings, the lever 41 has a transversely extending portion 46 to engage the releasing strap 31 to urge the releasing strap 31 forwardly.

As a safety device, a pin 48 is provided to be received by a hole 49 in the outermost end of the latch 29 to prevent inadvertent release of the device after it is set.

To support the device at the side of a body of water, a stake 50 is provided, the lower end 51 being adapted to be driven into the ground while the upper portion 52 is adapted to receive a sleeve 54 that is attached to the lower end of the support member 10. To prevent burring of the upper end of the stake, there is a cap 55 that can be placed over the upper end 52 to receive the blows while the stake is being driven into the ground. When the stake 50 is fixed in the ground, the sleeve 54 is slipped over the upper portion 52 of the stake 50, there being a stop flange 53 to limit the insertion of the portion 52 into the sleeve 54.

It will thus be seen that the device of the present invention provides a very simple automatic device for setting the hook in the mouth of a fish, even without attention from the fisherman. When the bait is taken by a fish, the fish will pull on the line 30 sufficiently hard to pull the releasing strap 31 forwardly, the forward movement being assisted by the resilient member 32 to release the ring 30 from the latch 29. The cross-arm 11 will then rotate in a clockwise direction pulled by the spring 16, then carried further by the weight 20. When the device is released, the fisherman will know that a fish has been caught and he can rush to the pole 36 to reel in the fish.

It will of course be understood by those skilled in the art that the device here presented is by way of illustration only, and is meant to be in no way restrictive; therefore, numerous changes and modifications may be made, and the full use of equivalents resorted to without departing from the spirit or scope of the invention as outlined in the appended claims.

What is claimed as invention is:

1. An automatic fishing device including stationary support means, means carried by said support means to hold a fishing rod, a cross-arm pivotally carried by said support means, a hook on one end of said cross-arm, spring means to urge said cross-arm to pivot in one direction, said one direction being such as to raise said hook on said one end of said cross-arm, means for preventing rotation of said cross-arm in said one direction, said means including a chain attached to said cross-arm, a ring at one end of said chain, a latch member carried by said support means to receive said ring, a releasing strap pivotally secured to said latch member in such fashion that when said releasing strap pivots upwardly, said ring will be urged off said latch.

2. An automatic fishing device including a vertical support member, a cross-arm pivotally carried by said vertical support member and having a forward portion and a rearward portion, a spring attached to said forward portion of said cross-arm and to the upper end of said vertical support member, a hook on the outermost end of said forward end of said cross-arm, a latch carried by said vertical support member and extending forwardly of said vertical support member substantially perpendicularly thereto, a chain having one end attached to said forward portion of said cross-arm, a ring carried by the opposite end of said chain, said ring being receivable on the outermost end of said latch member, a releasing means carried by said latch member, a hook attached to said vertical support member and adapted to receive the end of a fishing pole therein, said releasing means being operable by a line on said fishing pole, said line passing through said hook on the outermost end of said forward portion of said cross-arm, the arrangement being such that when said line is pulled taut, said releasing means will cause said ring to move off said latch member.

3. An automatic fishing device including a vertical support member, a cross-arm pivotally carried by said vertical support member and having a forward portion and a rearward portion, a spring attached to said forward portion of said cross-arm and to the upper end of said vertical support member, a hook on the outermost end of said forward end of said cross-arm, a latch carried by said vertical support member and extending forwardly of said vertical support member substantially perpendicularly thereto, a chain having one end attached to said forward portion of said cross-arm, a ring carried by the opposite end of said chain, said ring being receivable on the outermost end of said latch member, a releasing strap pivotally attached to said latch member and depending therefrom, said releasing strap being attached rearwardly of the outer end of said latch member, a hook attached to said vertical support member and adapted to receive the end of a fishing pole therein, said hook being slightly above the lowermost end of said releasing strap when said releasing strap is positioned substantially parallel to said vertical support member, said releasing strap having a notch in the lowermost end thereof to receive a line from said fishing pole, the arrangement being such that said line must be directed downwardly from said hook to pass through said notch in said releasing strap, then upwardly to pass through said hook on the outermost end of said forward portion of said cross-arm, the arrangement being such that when said line is pulled taut, said releasing strap will be urged forwardly and will cause said ring to move off said latch member.

4. An automatic fishing device including a vertical support member, a cross-arm pivotally carried by said vertical support member and having a forward portion and a rearward portion, a spring attached to said forward portion of said cross-arm and to the upper end of said vertical support member, a hook on the outermost end of said forward end of said cross-arm, a latch carried by said vertical support member and extending forwardly of said vertical support member substantially perpendicularly thereto, a chain having one end attached to said forward portion of said cross-arm, a ring carried by the opposite end of said chain, said ring being receivable on the outermost end of said latch member, a releasing strap pivotally attached to said latch member and depending therefrom, said releasing strap being attached rearwardly of the outer end of said latch member, an elastic member having one end attached to said releasing strap, the other end of said elastic member being attached to said forward portion of said cross-arm, a hook attached to said vertical support member and adapted to receive the end of a fishing pole therein, said hook being slightly above the lowermost end of said releasing strap when said releasing strap is positioned substantially parallel to said vertical support member, said releasing strap having a notch in the lowermost end thereof to receive a line from said fishing pole, the arrangement being such that said line must be directed downwardly from said hook to pass through said notch in said releasing strap, then upwardly to pass through said hook on the outermost end of said forward portion of said cross-arm, the arrangement being such that when said line is pulled taut, said releasing strap will be urged forwardly assisted by said elastic member and will cause said ring to move off said latch member.

5. An automatic fishing device including a vertical support member, a cross-arm pivotally carried by said vertical support member and having a forward portion and a rearward portion, a spring attached to said forward portion of said cross-arm and to the upper end of said vertical support member, a hook on the outermost end of said forward end of said cross-arm, a pair of brackets on said rearward portion of said cross-arm, said brackets being spaced apart along said rearward portion of said cross-arm, a rail between said brackets, a carriage mounted on said rail and moveable along said rail, a weight carried by said carriage, the arrangement being such that said carriage will move along said rail under the influence of gravity, a latch carried by said vertical support member and extending forwardly of said vertical support member substantially perpendicularly thereto, a chain having one end attached to said forward portion of said cross-arm, a ring carried by the opposite end of said chain, said ring being receivable on the outermost end of said latch member, a releasing strap pivotally attached to said latch member and depending therefrom, said releasing strap being attached rearwardly of the outer end of said latch member, an elastic member having one end attached to said releasing strap, the other end of said elastic member being attached to said forward portion of said cross-arm, a hook attached to said vertical support member and adapted to receive the end of a fishing pole therein, said hook being slightly above the lowermost end of said releasing strap when said releasing strap is positioned substantially parallel to said vertical support member, said releasing strap having a notch in the lowermost end thereof to receive a line from said fishing pole, the arrangement being such that said line must be directed downwardly from said hook to pass through said notch in said releasing strap, then upwardly to pass through said hook on the outermost end of said forward portion of said cross-arm, the arrangement being such that when said line is pulled taut, said releasing strap will be urged forwardly assisted by said elastic member, manual release means including a lever pivotally carried by said vertical support member and adjacent said releasing strap, spring means to urge said lever in one direction, means for manually urging said lever in the opposite direction, a transversely extending portion of said lever so located to engage said releasing strap, the arrangement being such that when said manual means is manipulated to urge said lever in said opposite direction, said transversely extending portion will engage said releasing strap to move said releasing strap forwardly and urge said ring off said latch member.

6. An automatic fishing device including a vertical support member, a cross-arm pivotally carried by said vertical support member and having a forward portion and a rearward portion, a spring attached to said forward portion of said cross-arm and to the upper end of said vertical support member, a hook on the outermost end of said forward end of said cross-arm, a pair of brackets on said rearward portion of said cross-arm, said brackets being spaced apart along said rearward portion of said cross-arm, a rail between said brackets, a carriage mounted on said rail and moveable along said rail, a weight carried by said carriage, the arrangement being such that said carriage will move along said rail under the influence of gravity, a latch carried by said vertical support member and extending forwardly of said vertical support member substantially perpendicularly thereto, a chain having one end attached to said forward portion of said cross-arm, a ring carried by the opposite end of said chain, said ring being receivable on the outermost end of said latch member, a releasing strap pivotally attached to said latch member and depending therefrom, said releasing strap being attached rearwardly of the outer end of said latch member, an elastic member having one end attached to said releasing strap, the other end of said elastic member being attached to said forward portion of said cross-arm, a hook attached to said vertical support member and adapted to receive the end of a fishing pole therein, said hook being slightly above the lowermost end of said releasing strap when said releasing strap is positioned substantially parallel to said vertical support member, said releasing strap having a notch in the lowermost end thereof to receive a line from said fishing pole, the arrangement being such that said line must be directed downwardly from said hook to pass through said notch in said releasing strap, then upwardly to pass through said hook on the outermost end of said forward portion of said cross-arm, the arrangement being such that when said line is pulled taut, said releasing strap will be urged forwardly assisted by said elastic member, manual release means including a lever pivotally carried by said vertical support member and adjacent said releasing strap, spring means to urge said lever in one direction, means for manually urging said lever in the opposite direction, a transversely extending portion of said lever so located to engage said releasing strap, the arrangement being such that when said manual means is manipulated to urge said lever in said opposite direction, said transversely extending portion will engage said releasing strap to move said releasing strap forwardly and urge said ring off said latch member, means for supporting said vertical support member including a sleeve on the lowermost end of said vertical support member, a stake having an upper portion and a lower portion, a stop separating said upper portion from said lower portion, said upper portion being receivable by said sleeve, said stop limiting the insertion of said upper portion of said stake into said sleeve.

References Cited by the Examiner
UNITED STATES PATENTS

| | | | |
|---|---|---|---|
| 693,071 | 2/1902 | Ruud | 43—15 |
| 2,008,482 | 7/1935 | Wolf | 43—15 |
| 2,773,326 | 12/1956 | Calvert | 43—16 |
| 2,944,360 | 7/1960 | Green | 43—16 |

ABRAHAM G. STONE, *Primary Examiner.*

R. L. HOLLISTER, *Assistant Examiner.*